United States Patent [19]
Hammel

[11] 4,123,598
[45] Oct. 31, 1978

[54] BATTERY PACK AND CONTAINER

[75] Inventor: Ronald O. Hammel, Englewood, Colo.

[73] Assignee: The Gates Rubber Company, Denver, Colo.

[21] Appl. No.: 899,036

[22] Filed: Apr. 24, 1978

[51] Int. Cl.² ............................................. H01M 6/42
[52] U.S. Cl. ..................................... 429/159; 429/99; 429/176; 429/178
[58] Field of Search ............ 429/159, 176, 9, 156–158, 429/149–155, 96–100, 178

[56] References Cited
U.S. PATENT DOCUMENTS

| | | | |
|---|---|---|---|
| 3,660,169 | 5/1972 | Clune et al. | 429/159 |
| 3,661,649 | 5/1972 | Kaye | 429/159 X |
| 3,859,140 | 1/1975 | Schmidt | 429/99 |
| 3,887,394 | 6/1975 | Kaye | 429/159 X |
| 4,091,187 | 5/1978 | Kaye | 429/159 |

Primary Examiner—Charles F. LeFevour
Attorney, Agent, or Firm—Curtis H. Castleman, Jr.; Raymond Fink; H. W. Oberg, Jr.

[57] ABSTRACT

A battery container, for housing as an example a 12-volt rechargeable battery of electrochemical cells, features a pair of co-fitting molded trays whose outer surfaces are formed of parallelized closely spaced elongate arches, forming a very compact container for immobilizing the cells in an integral battery assembly.

15 Claims, 6 Drawing Figures

BATTERY PACK AND CONTAINER

BACKGROUND OF THE INVENTION

This invention relates to battery packaging devices, and more particularly to battery pack cartridges housing a plurality of interconnected unitary cells.

Individualized electrochemical cells, including rechargeable cells, have been housed in various types of containers, such as shown in U.S. Pat. Nos. 3,220,888 (Moore et al), 3,650,841 (Brindley), and 3,977,907 (Roth et al). In a particular application to which the battery pack of the subject invention is applicable, portable televisions, radios, recorders and toys, for instance, have been powered by a battery of nine standard non-rechargeable "D" size cells, series connected in three/three cell strings. Three detached plastic tubes have been used to house three cells each, with the ends of the tubes being open for appropriate electrical connection. The voltage of this non-rechargeable battery under load is typically from about 11 to about 13 volts.

It is an object of the subject invention to provide a compact, integral replacement battery pack rechargeable or non-rechargeable cartridge where all of the cells are housed in a single container configured to minimize relative movements and vibrations of the cells, and which may be easily inserted or removed as a unit from the device being powered by the battery.

SUMMARY OF THE INVENTION

Briefly described, in one aspect the invention pertains to a battery container for housing adjacent rows of interconnected unitary electrochemical cells comprising a pair of co-fitting molded trays, at least one of the trays having an outer surface formed of a plurality of parallelized closely spaced elongate arches interconnected at adjoining base portions, end surfaces extending generally transverely of and bridging together the arches or marginal extensions thereof of the outer surface, and means provided in the container for receiving electrical conductive terminals, such as notches in the end surfaces of the trays.

In another aspect, the invention pertains to a battery pack cartridge comprising the battery container just discussed, together with stop surfaces formed at marginal portions of the arches, and a plurality of cylindrical electrically interconnected cells housed in closely adjacent mutual relationship in rows within elongate cylindrical chambers formed within the trays, with a portion of the cells abutting stop means to limit endwise movement of the cells, and electrically conductive contact terminals formed in the end surfaces serving as terminals of the battery for current withdrawal. As an embodiment of this aspect of the invention, a six-cell 12-volt battery pack is described as a replacement for the above described nine-cell battery.

BRIEF DESCRIPTION OF THE DRAWINGS

Certain preferred embodiments of the invention will be discussed in reference to the accompanying drawings, wherein like numerals designate like parts, and wherein.

PREFERRED EMBODIMENTS OF THE INVENTION

Figure 1:
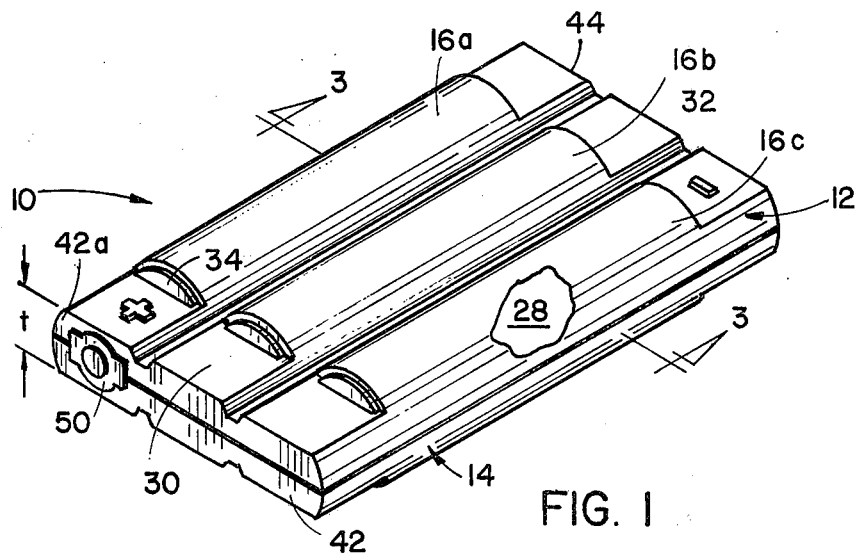
FIG. 1 is a perspective view of an empty battery container according to the invention.
Figure 3A:
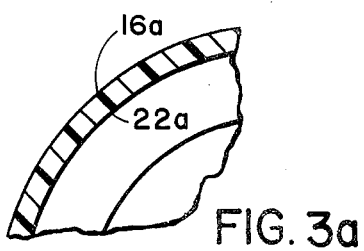
FIG. 3a is a partial, enlarged view of the container wall of FIG. 3.

Referring first to the embodiment of FIGS. 1, 3, 3a and 4, the container assembly 10 is generally composed of a pair of co-fitting molded trays 12 and 14, at least one of which, and preferably both, has a corrugated or furrowed major surface, defined by a plurality of adjacent elongated arches 16a, 16b and 16c. These arched surfaces are generally parallel to one another, and are interconnected at adjoining base portions 18, 20. It is preferred that the wall of the arches be formed of uniform gauge material so that there is defined inner troughs 22a, 22b, and 22c of corresponding arched configuration.

The lower tray half 14 is also preferably formed of interconnected elongate arches with corresponding trough inner surfaces so that, in conjunction with upper tray half 12, there is defined three adjoining elongate cylindrical chambers 24, 26, 28. The cylindrical chambers should have a cross dimension and length slightly larger than the electrochemical cells 30 to be housed therewithin, preferably so that a substantially glove fit is attained with minimized room for movement of the cells either relative to adjacent cells, or relative to the housing container 10.

Figure 3:
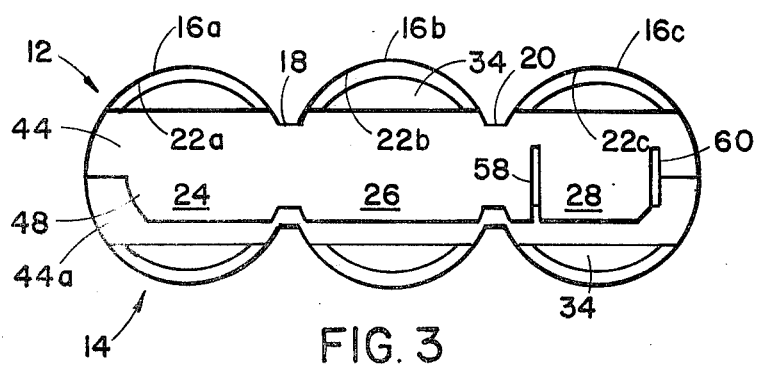
FIG. 3 is a sectional view taken along section 3—3 of FIG. 1.
Figure 4:
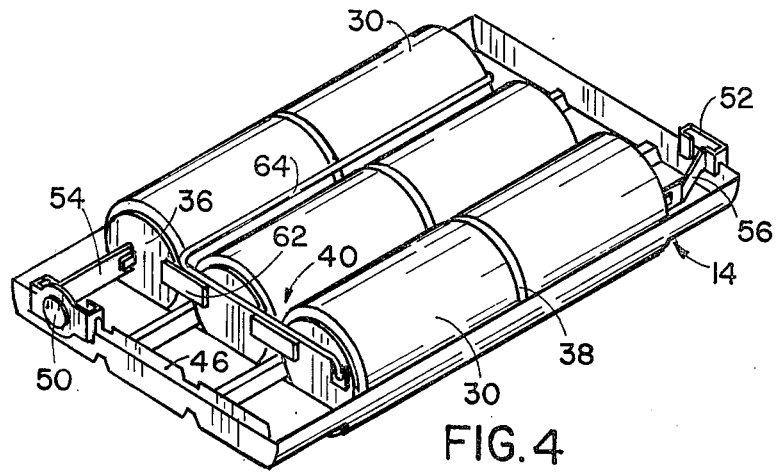
FIG. 4 is a perspective view of the lower half of the container of FIG. 1, housing a 12-volt battery.

With the three rows by two cells series connected battery shown in FIG. 4, employing two volt sealed rechargeable lead-acid batteries of "D" size, the battery subassembly is of lesser length than the overall cartridge. Thus, extensions of the arched surfaces 16a–16c, or the planar extensions 30, 32 shown are provided at the respective ends of the container, however, such extensions could also be provided in between cells within an individualized row, rather than at the ends. As shown, the cartridge at the planar extension portions is of lesser thickness, i.e., thickness "t", than the cross dimension or diameter of chambers 24–28, to thereby define a plurality of stops 34, of stepped surface as shown. This stepped surface is shaped to nest with the end surfaces 36 of the cells for close abutting relationship. As seen in FIG. 3 stops 34 are provided to abut along a chordal surface only at the top and bottom margins of the cells to provide space for the centrally located intercell connectors 62 and terminal connectors 54, 56 shown in FIG. 4. Coupled with the provision of the stops and conjugate fit of the cells within their respective trough surfaces of each of the tray halves, the trays are designed so that preferably the cells in a particular row make end-to-end contact, as at 38 and cell-to-cell side contact (tangential) 40 between cells in adjoining rows. This feature of substantial immobilization of the cells provides an integral cartridge resistant to vibration and possible premature failure of one or more of the cells of the battery.

The spacers 30, 32 terminate in downturned end surfaces 42, 44, which extend generally transversely of and bridge together the extensions 30, 32 of arches 16a–16c. The end surfaces substantially increase the rigidity of each of the tray halves. Alternate ends of the trays are additionally provided with offset lips 46, 48 which slide inside end surfaces 42a, 44a, respectively, to locate the halves of the trays one within the other.

Opposite corners of the container at each of the end surfaces are provided with positive 50 and negative 52 button terminals or the like for connection to an external circuit load. It is preferred that each of the button terminals comprise an elongated metal strip conductor 54, 56 which has sufficient rigidity to withstand inward longitudinal forces applied against each of the button contacts 50, 52, whereby the ends of the battery cartridge resist deformation and crushing. This is particularly advantageous when the wall thickness of the molded tray is thin (as shown), as in a vacuum-formed part.

The end surfaces are also provided with appropriate notches or recesses 58 and 60 formed in each of end segments 44 and 44a (only the negative terminal notches are shown), so that the generally T-shaped conductor terminals 54, 56 may be received in the notches, and the trays then assembled together.

Figure 2:
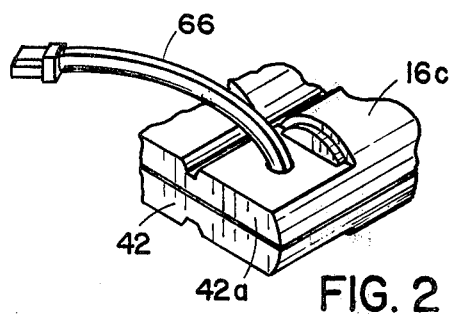
FIG. 2 is a partial view in perspective of a modification of the container of FIG. 1 provided with recharging leads for the battery.

The cells are shown series connected in FIG. 4, with conductor straps 62 linking the negative spade terminal of one cell to the positive spade terminal of an adjoining cell, etc., and with three cells at one end of the tray being electrically connected to the three cells at the opposite end of the tray through a conductive lead 64. In the event that the external load to which the battery cartridge is to be electrically connected does not have a built-in charger, then separate charging leads 66 may be brought up through an aperture in the cartridge, preferably in the end extensions as shown in FIG. 2.

The tray halves 12 and 14 may be connected together in desired fashion, such as by hinging, heat sealing, or by securing the adjoining surfaces along the perimeter with tape, for instance. The halves might also be provided with appropriate bosses and detents for a snap fit. The tray halves are preferably formed of molded plastic, such as an injection molded or vacuum-formed part. The latter method is particularly useful in such applications as portable televisions where there is extremely limited clearance between the battery and television battery compartment. Container materials which have been found suitable include polystyrene and polycarbonate. Sheet metal could also be used with electrical isolation.

Figure 5:
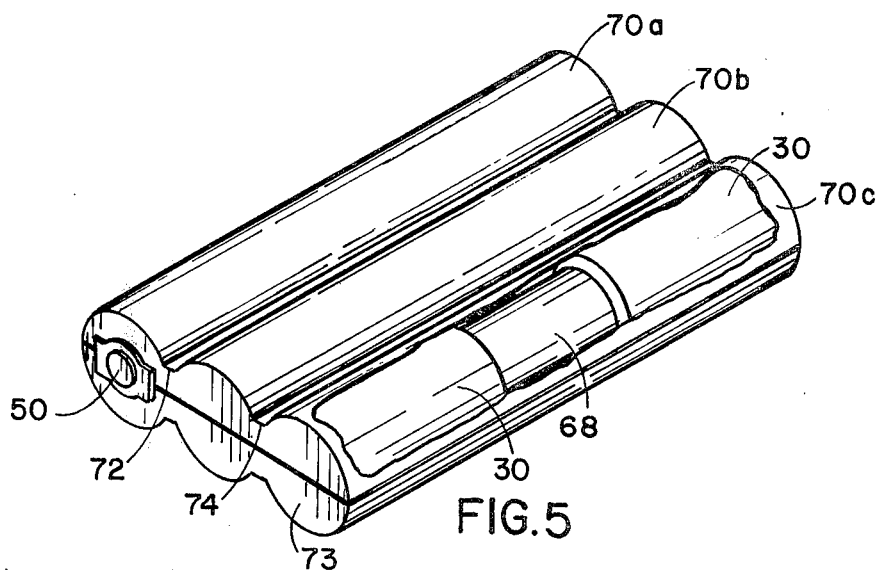
FIG. 5 is a perspective, partial cutaway view of a modification of the invention, showing arrangement of electrochemical cells and interposed spacers.

Referring now to the alternative embodiment shown in FIG. 5, the container is formed of three parallelized elongate arches 70a, 70b, 70c, interconnected at their base portions 72, 74. Rather than incorporating integral stops 34 as in the embodiment of FIG. 1, the elongate arches are provided continuously along the length of the cartridge, terminating in transverse end surfaces 73, with spacer means 68 being inserted in the inner cylindrical chambers intermediately of two cells 30 to provide the necessary immobilization of the battery pack. Those skilled in the art will appreciate various alternatives which can be employed for construction of a replacement battery pack according to the invention, in which the overall package is longer than required by the cell components employed.

The invention is capable of a variety of modifications and variations which will become apparent to those skilled in the art upon a reading of the present specification. The invention is intended to be limited only by the scope of the appended claims.

What is claimed is:

1. A battery container for housing adjacent rows of interconnected unitary electrochemical cells comprising a pair of co-fitting molded trays, at least one of said trays having an outer surface formed of a plurality of parallelized closely spaced elongate arches interconnected at adjoining base portions and defining within the container cylindrical chambers for receiving the cells, end surfaces extending generally transversely of and bridging together the arches or marginal extensions thereof of the outer surface, and notch means in the end surfaces for receiving electrical conductive terminal means.

2. The battery container of claim 1 wherein both trays are substantially identical in shape, and wherein the elongate arches of each tray define, interiorly of the container, multiple interconnected cylindrical chambers for receiving cylindrical shaped electrochemical cells.

3. The battery container of claim 1 wherein the elongate arches are positioned intermediate the end surfaces, and substantially flat marginal extensions are interposed between the end surfaces and arches.

4. The battery container of claim 3 wherein generally upright stop surfaces are formed at the juncture of the marginal extensions and ends of the elongate arches.

5. The battery container of claims 1 or 2 wherein at least one of the elongate arches extends the length of the container, from one end surface to the other end surface.

6. A molded battery container for housing unitary cylindrical electrochemical cells comprising:
opposed top and bottom major outer surfaces formed of multiple elongate arches adjacently interconnected and defining within the container corresponding elongate cylindrical chambers for receiving the cells;
end surfaces bridging the top and bottom major surfaces to form an integral container and adapted to receive terminals; and
stop means situated at the ends of the elongate arches for restricting endwise movement of the cells within the container.

7. The molded battery container of claim 6 wherein the top and bottom arched surfaces are separate members cofitting together.

8. The molded battery container of claim 7 wherein opposite end surfaces of the respective top and bottom arched surfaces are fitted with offset lips for locating the arched surfaces one within the other.

9. The molded battery container of claim 6 wherein the cylindrical chambers are interconnected within the container to permit cell-to-cell contact at the juncture of adjacent chambers.

10. A battery pack cartridge comprising:
a pair of co-fitting thin-walled unitary molded trays having corresponding mojor furrowed outer surfaces formed of parallelized closely spaced elongate arches interconnected at adjoining base portions, defining in assembly, multiple adjoining elongate cylindrical chambers within the cartridge;
tray end surfaces extending generally transversely of and downturned from the major surfaces of the trays and including notch means;
a plurality of cylindrical electrically interconnected electrochemical cells housed in closely adjacent mutual relationship in rows within the elongate cylindrical chambers; and electrically conductive contact terminal means housed in the notch means of the tray end surfaces, making respective connection with the opposite polarity terminals of the interconnected cells.

11. The battery pack cartridge of claim 10 wherein the cells in adjacent rows of chambers make substantial tangential cell-to-cell contact.

12. The battery pack cartridge of claim 10 wherein the cells are of the rechargeable type, and wherein there is provided contact leads protruding from the cartridge for recharging the battery.

13. The battery pack cartridge of claim 10 wherein the contact terminals means are button contacts located at opposite corners of the cartridge.

14. The battery pack cartridge of claim 10 wherein at least a portion of said arches terminate in stop surfaces intermediate the ends of the cartridge, and wherein at least a portion of the cells at their end surfaces are in close abutting relationship to the stop surfaces to limit endwise movement thereof.

15. The battery pack cartridge of claim 10 wherein the contact terminal means comprise elongated, substantially rigid metal strips.

* * * * *